United States Patent
Shi

(10) Patent No.: US 12,553,393 B1
(45) Date of Patent: Feb. 17, 2026

(54) AIRCRAFT, BLEED-AIR SYSTEMS FOR AIRCRAFT, AND METHODS OF PROVIDING THRUST TO AIRCRAFT

(71) Applicant: The Boeing Company, Arlington, VA (US)

(72) Inventor: Mingxuan Shi, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/970,185

(22) Filed: Dec. 5, 2024

(51) Int. Cl.
| | |
|---|---|
| *B64D 13/08* | (2006.01) |
| *B64D 13/02* | (2006.01) |
| *B64D 13/06* | (2006.01) |
| *F02C 9/18* | (2006.01) |

(52) U.S. Cl.
CPC ............... *F02C 9/18* (2013.01); *B64D 13/02* (2013.01); *B64D 13/06* (2013.01); *B64D 13/08* (2013.01); *B64D 2013/0603* (2013.01); *B64D 2013/0618* (2013.01)

(58) Field of Classification Search
CPC ............ B64D 13/02; B64D 13/06; B64D 2013/0603; B64D 13/08; B64D 2013/0618; F02C 9/18
See application file for complete search history.

(56) References Cited

U.S. PATENT DOCUMENTS

| | | | | |
|---|---|---|---|---|
| 2,734,356 A | * | 2/1956 | Kleinhaus | B64D 13/04 62/402 |
| 2,734,443 A | * | 2/1956 | Wood | B64D 13/04 454/71 |
| 4,261,416 A | * | 4/1981 | Hamamoto | B64D 13/06 62/133 |
| 4,262,495 A | * | 4/1981 | Gupta | B64D 13/06 62/89 |
| 4,312,191 A | * | 1/1982 | Biagini | B64D 13/06 62/402 |
| 4,430,867 A | * | 2/1984 | Warner | B64D 13/06 62/402 |
| 5,442,905 A | * | 8/1995 | Claeys | B64D 41/00 60/785 |
| 5,967,461 A | * | 10/1999 | Farrington | B64D 13/06 454/115 |
| 11,014,677 B2 | | 5/2021 | DeFrancesco et al. | |
| 2015/0107261 A1 | * | 4/2015 | Moes | B64D 41/00 60/785 |
| 2020/0180772 A1 | * | 6/2020 | Richardson | B64D 13/08 |

* cited by examiner

*Primary Examiner* — Thomas P Burke
(74) *Attorney, Agent, or Firm* — Kolitch Romano Dascenzo Gates LLP

(57) ABSTRACT

Bleed-air systems comprise a bleed-air turbine configured to receive at least a first portion of bleed air from a jet engine and deliver it to a cabin, a cabin-exhaust compressor operatively coupled to the bleed-air turbine and configured to receive cabin exhaust air from the cabin, and a cabin-exhaust nozzle configured to receive the cabin exhaust air from the cabin-exhaust compressor. Aircraft comprise a fuselage, a wing, a jet engine, and a bleed-air system. Methods comprise expanding at least a first portion of bleed air from a jet engine to drive a cabin-exhaust compressor, compressing cabin exhaust air from a cabin with the cabin-exhaust compressor, and nozzling the cabin exhaust air to environment.

20 Claims, 3 Drawing Sheets

AIRCRAFT, BLEED-AIR SYSTEMS FOR AIRCRAFT, AND METHODS OF PROVIDING THRUST TO AIRCRAFT

FIELD

The present disclosure relates to bleed-air systems of aircraft.

BACKGROUND

In modern jet aircraft, it is common to divert a portion of the air being compressed in a jet engine's compressor for various pneumatic systems of the aircraft. However, this "bleed air" degrades the jet engine's performance. Moreover, typically, the pressure of the bleed air must be reduced, and in some instances significantly reduced, for use in downstream pneumatic systems. This reduction in pressure results in heat that is not utilized or fully utilized, resulting in a waste of power and thus a reduction in efficiency of the overall aircraft.

SUMMARY

Bleed-air systems comprise a bleed-air turbine, a cabin-exhaust compressor, and a cabin-exhaust nozzle. The bleed-air turbine is configured to receive at least a first portion of bleed air from a jet engine of the aircraft and to deliver it to a cabin of the aircraft. The cabin-exhaust compressor is operatively coupled to the bleed-air turbine and is configured to receive cabin exhaust air from the cabin. The cabin-exhaust nozzle is configured to receive the cabin exhaust air from the cabin-exhaust compressor and thereby provide thrust for the aircraft.

Aircraft comprise a fuselage, a wing supported by the fuselage, a jet engine supported by the wing, and a bleed-air system according to the present disclosure.

Methods of providing thrust to aircraft comprise expanding at least a first portion of bleed air from a jet engine of the aircraft to drive a cabin-exhaust compressor, compressing cabin exhaust air from a cabin of the aircraft with the cabin-exhaust compressor, and nozzling the cabin exhaust air to environment.

DESCRIPTION

Figure 1:
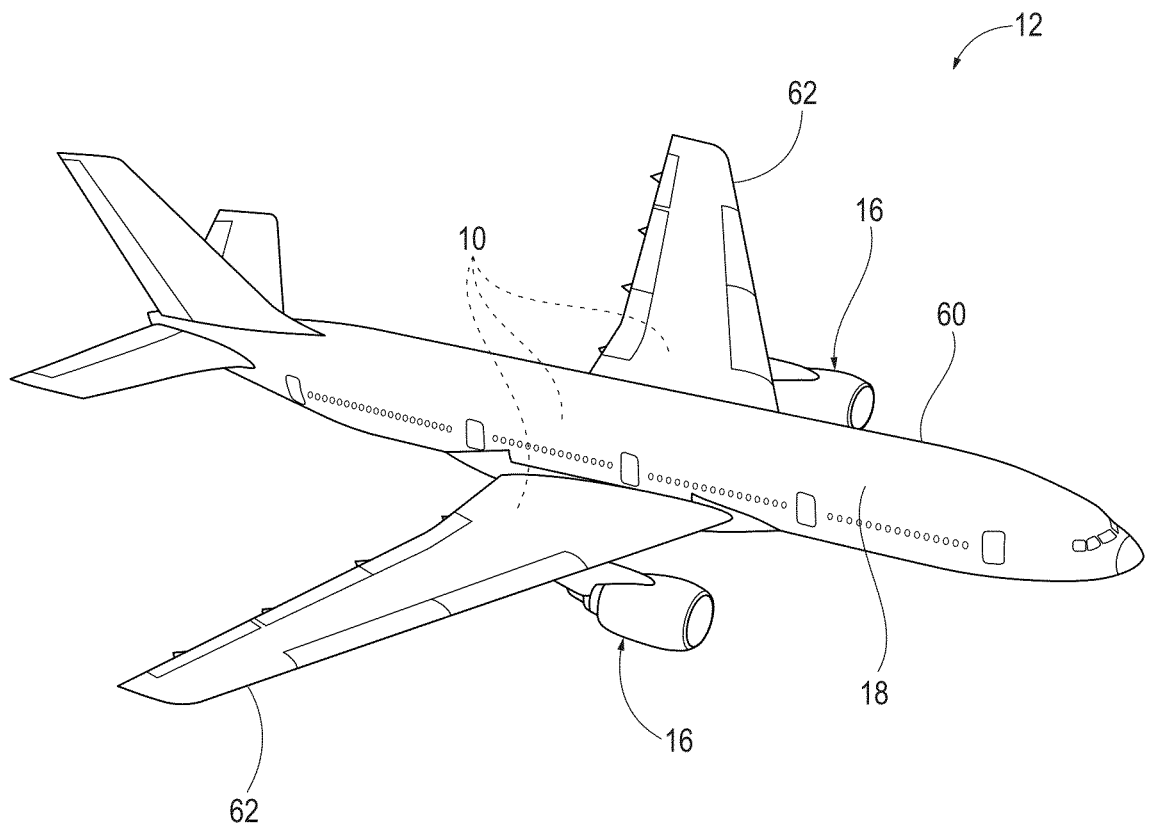
FIG. 1 is an illustration of an example aircraft according to the present disclosure.

FIG. 1 illustrates a non-exclusive example of an aircraft 12 that may comprise one or more bleed-air systems 10 according to the present disclosure. While illustrated as a fixed-wing airliner comprising a fuselage 60 having a cabin 18, two wings 62 supported by the fuselage 60, and a jet engine 16 supported by each wing 62, other configurations of aircraft 12 are within the scope of the present disclosure, including, for example, rotorcraft, military craft, autonomous aircraft, etc. FIG. 1 schematically illustrates that one or more components of, and optionally all of, a bleed-air system 10 may be supported by, or housed in, one or more of the fuselage 60 and/or the wing(s) 62 of an aircraft 12.

Figure 2:
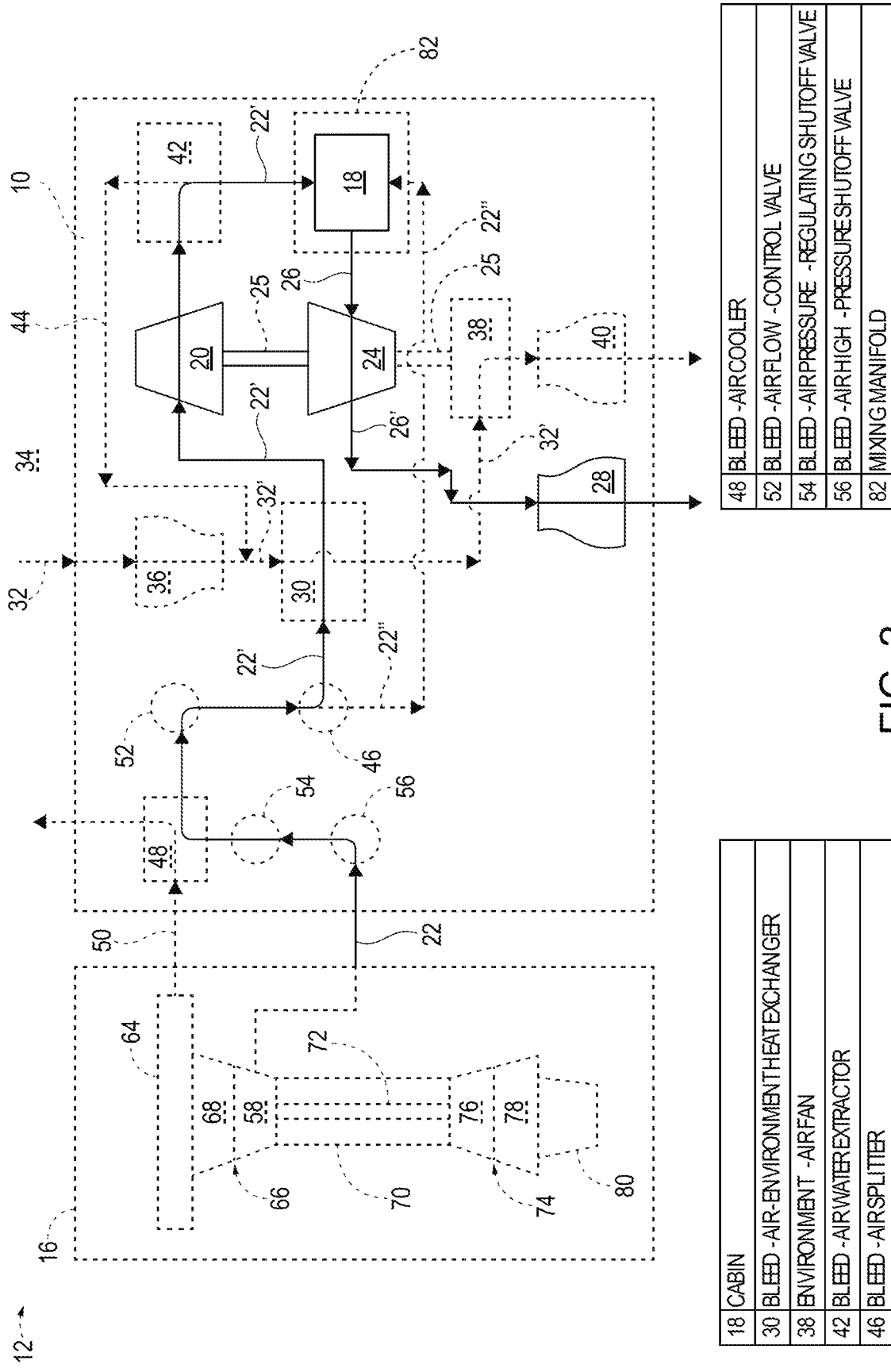
FIG. 2 is a schematic diagram representing aircraft and bleed-air systems according to the present disclosure.

FIG. 2 schematically represents bleed-air systems 10 according to the present disclosure. Generally, in FIG. 2, elements that are likely to be included in a given example are illustrated in solid lines, while elements that are optional to a given example or that correspond to a specific example are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 2, bleed-air systems 10 comprise at least a bleed-air turbine 20, a cabin-exhaust compressor 24, and a cabin-exhaust nozzle 28. The bleed-air turbine 20 is configured to receive at least a first portion 22' of bleed air 22 from a jet engine 16 of an aircraft 12 and to deliver it ultimately to a cabin 18 of the aircraft 12. The cabin 18 may be any volume of air desired to be maintained within a desired condition, such as within a desired pressure range and a desired humidity range. Typically, the cabin 18 of an aircraft 12 is the volume in which passengers and aircraft personnel are present; however, a cabin 18 of an aircraft 12 having a bleed-air system 10 may be any volume of regulated air and is not limited to the passenger compartment of a passenger aircraft, such as an airliner.

In FIG. 2, the jet engine 16 is schematically represented as a turbofan jet engine comprising a fan 64, a compressor 66 having a low-pressure compressor stage 68 and a high-pressure compressor stage 58, a combustion chamber 70, a turbine 74 having a high-pressure turbine stage 76 and a low-pressure turbine stage 78, a shaft 72 operatively coupling the turbine 74 to the compressor 66, and a nozzle 80. Some bleed-air systems 10 are configured to receive the bleed air 22 from the high-pressure compressor stage 58 of the jet engine 16. However, bleed-air systems 10 may receive the bleed air 22 from any suitable source or location from the jet engine 16. Also, bleed-air systems 10 may be used with other configurations of jet engines 16, and jet engines 16 are not limited to turbofan jet engines.

As schematically represented in FIG. 2, the cabin-exhaust compressor 24 is operatively coupled to the bleed-air turbine 20 (e.g., via a shaft 25) and is configured to receive and compress cabin exhaust air 26 from the cabin 18 to generate compressed cabin exhaust air 26'. The cabin exhaust air 26 is air that is extracted from, or otherwise is permitted to escape from, the cabin 18.

The cabin-exhaust nozzle 28 is configured to receive the compressed cabin exhaust air 26' from the cabin-exhaust compressor 24 and thereby provide thrust for the aircraft 12. That is, the cabin-exhaust nozzle 28 is operatively configured to nozzle the compressed cabin exhaust air 26' aft of the aircraft 12 to add to the forward thrust of the aircraft 12.

As schematically represented in FIG. 2, some examples of bleed-air systems 10 further comprise a bleed-air-environment-air heat exchanger 30 that is configured to receive at least the first portion 22' of the bleed air 22 from the jet engine 16, receive environment air 32 from environment 34 via an environment-air inlet 36, cool at least the first portion 22' of the bleed air 22, and deliver at least the first portion 22' of the bleed air 22 to the bleed-air turbine 20. In other words, the bleed-air-environment-air heat exchanger 30 utilizes environment air to cool at least the first portion 22' of the bleed-air, not by mixing the two together, but rather by exchanging heat between the two air streams passing through the bleed-air-environment-air heat exchanger 30.

Some such examples of bleed-air systems 10 that comprise a bleed-air-environment-air heat exchanger 30 also comprise an environment-air fan 38, and an environment-air nozzle 40. When present, the environment-air fan 38 is operatively coupled to the cabin-exhaust compressor 24 (e.g., via the shaft 25) and is configured to receive the environment air 32 from the bleed-air-environment-air heat exchanger 30. That is, the environment-air fan 38 is driven by the bleed-air turbine 20, as is the cabin-exhaust compressor 24. The environment-air nozzle 40 is configured to receive the environment air 32 from the environment-air fan 38 and thereby provide thrust for the aircraft 12. That is, the environment-air nozzle 40 is operatively configured to nozzle the environment air 32 aft of the aircraft 12 to add to the forward thrust of the aircraft 12.

With continued reference to FIG. 2, some bleed-air systems 10 further comprise a bleed-air water extractor 42 that is configured to receive at least the first portion 22' of the bleed air 22 from the bleed-air turbine 20 and extract bleed-air water 44 therefrom. Specifically, the bleed air 22 may have a moisture content greater than desired for delivery to the cabin 18. In some such examples that also comprise the bleed-air-environment-air heat exchanger 30, the bleed-air water extractor 42 is configured to deliver the bleed-air water 44 to the environment air 32 for delivery of wet environment air 32' to the bleed-air-environment-air heat exchanger 30. In particular, the bleed-air water 44 will serve to cool the environment air 32 for more efficient cooling operation of the bleed-air-environment-air heat exchanger 30.

As schematically represented in FIG. 2, some bleed-air systems 10 further comprise a bleed-air splitter 46 that is configured to split the bleed air 22 into the first portion 22' and a second portion 22", deliver the first portion 22' to the bleed-air turbine 20 as discussed above, and deliver the second portion 22" ultimately to the cabin 18. The second portion 22" typically is a small percentage (e.g., less than 10%, less than 5%, or less than 1% by volume) of the bleed air 22, and is used for temperature control of air delivered to the cabin 18. The second portion 22" of bleed air 22 additionally may be referred to as, or described as, trim air. Bleed-air systems 10 typically will further comprise a mixing manifold 82 that receives the first portion 22' and the second portion 22" of the bleed air 22, and optionally air from environment, for operative mixing of the air streams for delivery to the cabin 18 at a desired condition.

With continued reference to FIG. 2, some bleed-air systems 10 further comprise a bleed-air cooler 48 that is configured to receive the bleed air 22 from the jet engine 16, receive cooling air 50, and cool the bleed air 22 prior to its delivery toward the bleed-air turbine 20. The bleed-air cooler 48 additionally or alternatively may be described as, or referred to as, a heat exchanger. In examples of bleed-air systems 10 that also comprise a bleed-air-environment-air heat exchanger 30, the bleed-air cooler 48 may be described as a precooler. In some examples, the cooling air 50 is engine-fan bypass air from the jet engine 16, that is air, that is drawn from the fan 64 of a turbofan jet engine; however, the cooling air 50 may be drawn from any suitable source. In some examples of bleed-air systems 10 that also comprise a bleed-air splitter 46, the bleed-air cooler 48 is upstream of the bleed-air splitter 46, as schematically represented in FIG. 2. Herein, "upstream" and "downstream" refer to a direction of flow of a respective fluid. Accordingly, a first structure that is described as being upstream of a second structure receives the respective fluid prior to the second structure, and the second structure may be described as being downstream of the first structure with respect to that fluid.

As schematically represented in FIG. 2, some bleed-air systems 10 further comprise a bleed-air flow-control valve 52 that is upstream of the bleed-air turbine 20 and that is configured to receive the bleed air 22 from the jet engine 16 and reduce a pressure of the bleed air 22. In examples of bleed-air systems 10 that also comprise a bleed-air splitter 46, the bleed-air flow-control valve 52 may be upstream of the bleed-air splitter and thus be configured to deliver the bleed air 22 to the bleed-air splitter 46. In examples of bleed-air systems 10 that also comprise a bleed-air cooler 48, the bleed-air flow-control valve 52 may be downstream of the bleed-air cooler and thus be configured to receive the bleed air 22 from the bleed-air cooler 48.

With continued reference to FIG. 2, some bleed-air systems 10 further comprise a bleed-air pressure-regulating shutoff valve 54 that is upstream of the bleed-air turbine 20 and that is configured to receive the bleed air 22 from the jet engine 16, regulate a pressure of the bleed air 22, and selectively shut off the bleed air 22 responsive to an input. For example, the bleed-air pressure-regulating shutoff valve 54 may be configured to shut off the bleed air 22 responsive to detection of an engine fire. In some examples that also comprise a bleed-air splitter 46, the bleed-air pressure-regulating shutoff valve 54 is upstream of the bleed-air splitter 46. In some examples that also comprise a bleed-air cooler 48, the bleed-air pressure-regulating shutoff valve 54 may be upstream of the bleed-air cooler 48. In some examples that also comprise a bleed-air flow-control valve 52, the bleed-air pressure-regulating shutoff valve 54 is upstream of the bleed-air flow-control valve 52.

As also schematically represented in FIG. 2, some bleed-air systems 10 further comprise a bleed-air high-pressure shutoff valve 56 that is upstream of the bleed-air turbine 20 and that is configured to receive the bleed air 22 from the jet engine 16 and permit a flow of the bleed air 22 only upon a pressure of the bleed air 22 exceeding a threshold pressure. For example, the bleed-air high-pressure shutoff valve 56 may be a check valve that is open only when the bleed air 22 is above a threshold pressure. In some examples that also comprise a bleed-air splitter 46, the bleed-air high-pressure shutoff valve 56 is upstream of the bleed-air splitter 46. In some examples that also comprise a bleed-air cooler 48, the bleed-air high-pressure shutoff valve 56 is upstream of the bleed-air cooler 48. In some examples that also comprise a bleed-air flow-control valve 52, the bleed-air high-pressure shutoff valve 56 is upstream of the bleed-air flow-control valve 52. In some examples that also comprise a bleed-air pressure-regulating shutoff valve 54, the bleed-air high-pressure shutoff valve 56 is upstream of the bleed-air pressure-regulating shutoff valve 54.

Figure 3:
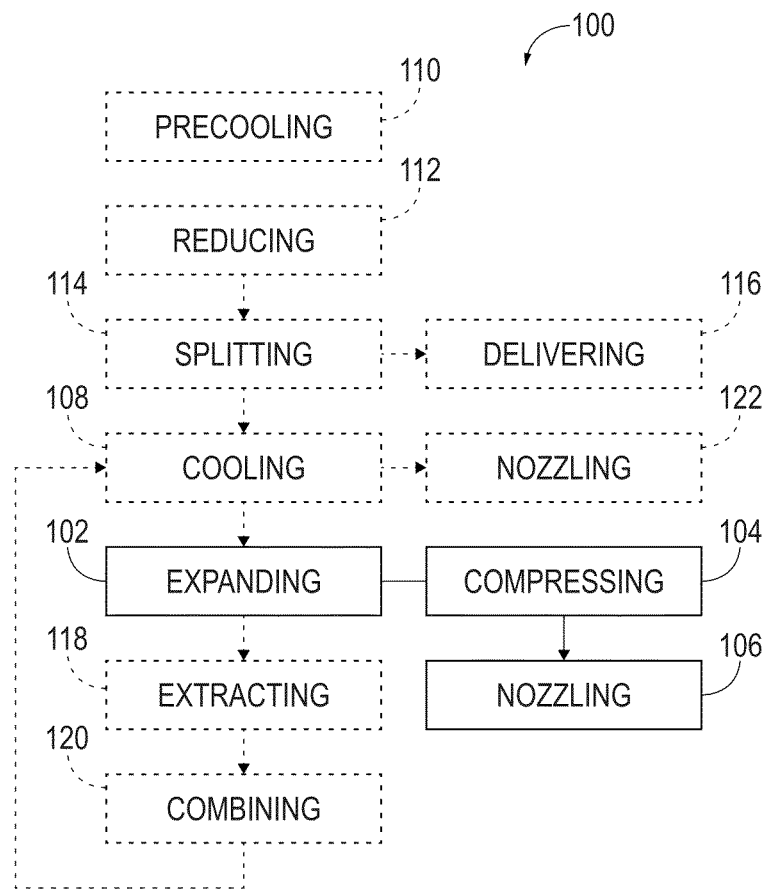
FIG. 3 is a flowchart schematically representing methods according to the present disclosure.

FIG. 3 schematically provides a flowchart that represents illustrative, non-exclusive examples of methods 100 according to the present disclosure. In FIG. 3, some steps are illustrated in dashed boxes indicating that such steps may be optional or may correspond to a specific example of a method 100 according to the present disclosure. That said, not all methods 100 according to the present disclosure are required to include the steps illustrated in solid boxes. The methods 100 and steps illustrated in FIG. 3 are not limiting and other methods and steps are within the scope of the present disclosure, including methods 100 having greater than or fewer than the number of steps illustrated, as understood from the discussions herein.

As schematically represented in FIG. 3 and with reference to FIG. 2, methods 100 typically comprise at least expanding 102 at least a first portion 22' of bleed air 22 from a jet engine 16 of an aircraft 12 to drive a cabin-exhaust compressor 24, compressing 104 cabin exhaust air 26 from a cabin 18 of the aircraft 12 with the cabin-exhaust compressor 24, and nozzling 106 the compressed cabin exhaust air 26' to environment 34. Accordingly, methods 100 may be described as methods of providing thrust to an aircraft 12. Additionally or alternatively, methods 100 may be described as, or referred to as, bleed-air methods. While elements of methods 100 are labeled with reference numerals of FIG. 2, and methods 100 may be implemented by bleed-air systems 10 according to the present disclosure, methods 100 are not limited to being implemented by bleed-air systems 10.

Some methods 100 further cooling 108 at least the first portion 22' of the bleed air 22 upstream of the expanding 102. Some such methods 100 further comprise precooling 110 at least the first portion 22' of the bleed air 22 upstream of the cooling 108.

Some methods 100 comprising reducing 112 a pressure of at least the first portion 22' of the bleed air 22 upstream of the cooling 108. In some such examples, the precooling 110 is performed upstream of the reducing 112.

Some methods 100 further comprise splitting 114 the bleed air 22 into the first portion 22' and a second portion 22" and delivering 116 the second portion 22" ultimately to the cabin 18 of the aircraft 12. In some such examples, the splitting 114 is upstream of the cooling 108. In some examples, the precooling 110 is upstream of the splitting 114.

Some methods 100 further comprise extracting 118 bleed-air water 44 from at least the first portion 22' of the bleed air 22 downstream of the expanding 102. In some such examples, the cooling 108 is performed at least in part with the bleed-air water 44.

Some methods 100 further comprise combining 120 the bleed-air water 44 with environment air 32 to create wet environment air 32'. In some such examples, the cooling 108 is performed with the wet environment air 32'. Some methods 100 further comprise nozzling (122) the wet environment air 32' to the environment 34, thereby providing additional thrust to the aircraft 12.

Illustrative, non-exclusive examples of inventive subject matter according to the present disclosure are described in the following enumerated paragraphs:

A. A bleed-air system (10) for an aircraft (12) having a jet engine (16) and a cabin (18), the bleed-air system (10) comprising:
  a bleed-air turbine (20) configured to receive at least a first portion (22') of bleed air (22) from the jet engine (16) and to deliver the at least the first portion (22') of the bleed air (22) to the cabin (18);
  a cabin-exhaust compressor (24) operatively coupled to the bleed-air turbine (20) and configured to receive cabin exhaust air (26) from the cabin (18); and
  a cabin-exhaust nozzle (28) configured to receive the cabin exhaust air (26) from the cabin-exhaust compressor (24) and thereby provide thrust for the aircraft (12).

A1. The bleed-air system (10) of paragraph A, further comprising a bleed-air-environment-air heat exchanger (30) configured to:
  receive the at least the first portion (22') of the bleed air (22) from the jet engine (16);
  receive environment air (32) from environment (34) via an environment-air inlet (36);
  cool the at least the first portion (22') of the bleed air (22); and
  deliver the at least the first portion (22') of the bleed air (22) to the bleed-air turbine (20).

A1.1. The bleed-air system (10) of paragraph A1, further comprising:
  an environment-air fan (38) operatively coupled to the cabin-exhaust compressor (24) and configured to receive the environment air (32) from the bleed-air-environment-air heat exchanger (30); and
  an environment-air nozzle (40) configured to receive the environment air (32) from the environment-air fan (38) and thereby provide thrust for the aircraft (12).

A2. The bleed-air system (10) of any of paragraphs A-A1.1, further comprising a bleed-air water extractor (42) configured to receive the at least the first portion (22') of the bleed air (22) from the bleed-air turbine (20) and extract bleed-air water (44) from the at least the first portion (22') of the bleed air (22).

A2.1. The bleed-air system (10) of paragraph A2 when depending from paragraph A1, wherein the bleed-air water extractor (42) is configured to deliver the bleed-air water (44) to the environment air (32) for delivery of wet environment air (32') to the bleed-air-environment-air heat exchanger (30).

A3. The bleed-air system (10) of any of paragraphs A-A2.1, further comprising a bleed-air splitter (46) configured to:
  split the bleed air (22) into the first portion (22') and a second portion (22");
  deliver the first portion (22') to the bleed-air turbine (20); and
  deliver the second portion (22") to the cabin (18).

A4. The bleed-air system (10) of any of paragraphs A-A3, further comprising a bleed-air cooler (48) configured to:
  receive the bleed air (22) from the jet engine (16);
  receive cooling air (50); and
  cool the bleed air (22).

A4.1. The bleed-air system (10) of paragraph A4, wherein the cooling air (50) is engine-fan bypass air from the jet engine (16).

A4.2. The bleed-air system (10) of any of paragraphs A4-A4.1 when depending from paragraph A3, wherein the bleed-air cooler (48) is upstream of the bleed-air splitter (46).

A5. The bleed-air system (10) of any of paragraphs A-A4.2, further comprising a bleed-air flow-control valve (52) upstream of the bleed-air turbine (20) and configured to:
  receive the bleed air (22) from the jet engine (16); and
  reduce a pressure of the bleed air (22).

A5.1. The bleed-air system (10) of paragraph A5 when depending from paragraph A3, wherein the bleed-air flow-control valve (52) is configured to deliver the bleed air (22) to the bleed-air splitter (46).

A5.2. The bleed-air system (10) of paragraph A5.1 when depending from paragraph A4, wherein the bleed-air flow-control valve (52) is configured to receive the bleed air (22) from the bleed-air cooler (48).

A6. The bleed-air system (10) of any of paragraphs A-A5.2, further comprising a bleed-air pressure-regulating shutoff valve (54) upstream of the bleed-air turbine (20) and configured to:
  receive the bleed air (22) from the jet engine (16);
  regulate a/the pressure of the bleed air (22); and
  selectively shut off the bleed air (22) responsive to an input.

A6.1. The bleed-air system (10) of paragraph A6 when depending from paragraph A3, wherein the bleed-air pressure-regulating shutoff valve (54) is upstream of the bleed-air splitter (46).

A6.2. The bleed-air system (10) of any of paragraphs A6-A6.1 when depending from paragraph A4, wherein the bleed-air pressure-regulating shutoff valve (54) is upstream of the bleed-air cooler (48).

A6.3. The bleed-air system (10) of any of paragraphs A6-A6.2 when depending from paragraph A5, wherein the bleed-air pressure-regulating shutoff valve (54) is upstream of the bleed-air flow-control valve (52).

A7. The bleed-air system (10) of any of paragraphs A-A6.3, further comprising a bleed-air high-pressure shutoff valve (56) upstream of the bleed-air turbine (20) and configured to:
 receive the bleed air (22) from the jet engine (16); and
 permit a flow of the bleed air (22) only upon a/the pressure of the bleed air (22) exceeding a threshold pressure.

A7.1. The bleed-air system (10) of paragraph A7 when depending from paragraph A3, wherein the bleed-air high-pressure shutoff valve (56) is upstream of the bleed-air splitter (46).

A7.2. The bleed-air system (10) of any of paragraphs A7-A7.1 when depending from paragraph A4, wherein the bleed-air high-pressure shutoff valve (56) is upstream of the bleed-air cooler (48).

A7.3. The bleed-air system (10) of any of paragraphs A7-A7.2 when depending from paragraph A5, wherein the bleed-air high-pressure shutoff valve (56) is upstream of the bleed-air flow-control valve (52).

A7.4. The bleed-air system (10) of any of paragraphs A7-A7.3 when depending from paragraph A6, wherein the bleed-air high-pressure shutoff valve (56) is upstream of the bleed-air pressure-regulating shutoff valve (54).

A8. The bleed-air system (10) of any of paragraphs A-A7.4, wherein the bleed-air system (10) is configured to receive the bleed air (22) from a high-pressure compressor stage (58) of the jet engine (16).

B. An aircraft (12), comprising:
 a fuselage (60);
 a wing (62) supported by the fuselage (60);
 a jet engine (16) supported by the wing (62); and
 the bleed-air system (10) of any of paragraphs A-A8.

B1. The aircraft (12) of paragraph B, wherein the bleed-air turbine (20) and the cabin-exhaust compressor (24) are supported by the wing (62).

B2. The aircraft (12) of any of paragraphs B-B1, wherein the bleed-air turbine (20) and the cabin-exhaust compressor (24) are housed within the wing (62).

B3. The aircraft (12) of any of paragraphs B-B2 when depending from paragraph A1.1, wherein the environment-air fan (38) is supported by the wing (62).

B4. The aircraft (12) of any of paragraphs B-B3 when depending from paragraph A1.1, wherein the environment-air fan (38) is housed within the wing (62).

C. A method (100) of providing thrust to an aircraft (12), the method (100) comprising:
 expanding (102) at least a first portion (22') of bleed air (22) from a jet engine (16) of the aircraft (12) to drive a cabin-exhaust compressor (24);
 compressing (104) cabin exhaust air (26) from a cabin (18) of the aircraft (12) with the cabin-exhaust compressor (24); and
 nozzling (106) the cabin exhaust air (26) to environment (34).

C1. The method (100) of paragraph C, further comprising cooling (108) the at least the first portion (22') of the bleed air (22) upstream of the expanding (102).

C1.1. The method (100) of paragraph C1, further comprising precooling (110) the at least the first portion (22') of the bleed air (22) upstream of the cooling (108).

C1.2. The method (100) of any of paragraphs C1-C1.1, further comprising reducing (112) a pressure of the at least the first portion (22') of the bleed air (22) upstream of the cooling (108).

C1.2.1. The method (100) of paragraph C1.2 when depending from paragraph C1.1, wherein the precooling (110) is performed upstream of the reducing (112).

C2. The method (100) of any of paragraphs C-C1.2.1, further comprising:
 splitting (114) the bleed air (22) into the first portion (22') and a second portion (22"); and
 delivering (116) the second portion (22") to the cabin (18).

C2.1. The method (100) of paragraph C2 when depending from paragraph C1, wherein the splitting (114) is upstream of the cooling (108).

C2.2. The method (100) of any of paragraphs C2-C2.1 when depending from paragraph C1.1, wherein the precooling (110) is upstream of the splitting (114).

C3. The method (100) of any of paragraphs C-C2.2, further comprising extracting (118) bleed-air water (44) from the at least the first portion (22') of the bleed air (22) downstream of the expanding (102).

C3.1. The method (100) of paragraph C3 when depending from paragraph C1, wherein the cooling (108) is performed at least in part with the bleed-air water (44).

C3.2. The method (100) of any of paragraphs C3-C3.1, further comprising combining (120) the bleed-air water (44) with environment air (32) to create wet environment air (32').

C3.2.1. The method (100) of paragraph C3.2, wherein the cooling (108) is performed with the wet environment air (32').

C3.2.2. The method (100) of any of paragraphs C3.2-C3.2.1, further comprising nozzling (122) the wet environment air (32') to the environment (34).

C4. The method (100) of any of paragraphs C-C3.2.2, wherein the method (100) is performing utilizing the bleed-air system (10) of any of paragraphs A-A8.

D. Use of the bleed-air system (10) of any of paragraphs A-A8 to provide thrust to the aircraft (12).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A bleed-air system for an aircraft having a jet engine and a cabin, the bleed-air system comprising:
    a bleed-air turbine configured to receive at least a first portion of bleed air from the jet engine and to deliver the at least the first portion of the bleed air to the cabin;
    a cabin-exhaust compressor operatively coupled to the bleed-air turbine and configured to receive and compress cabin exhaust air from the cabin to generate compressed cabin exhaust air; and
    a cabin-exhaust nozzle configured to receive the compressed cabin exhaust air directly downstream from the cabin-exhaust compressor and thereby provide thrust for the aircraft.

2. The bleed-air system of claim 1, further comprising a bleed-air-environment-air heat exchanger configured to:
    receive the at least the first portion of the bleed air from the jet engine;
    receive environment air from environment via an environment-air inlet;
    cool the at least the first portion of the bleed air; and
    deliver the at least the first portion of the bleed air to the bleed-air turbine.

3. The bleed-air system of claim 2, further comprising:
    an environment-air fan operatively coupled to the cabin-exhaust compressor and configured to receive the environment air from the bleed-air-environment-air heat exchanger; and
    an environment-air nozzle configured to receive the environment air from the environment-air fan and thereby provide thrust for the aircraft.

4. The bleed-air system of claim 1, further comprising a bleed-air water extractor configured to receive the at least the first portion of the bleed air from the bleed-air turbine and extract bleed-air water from the at least the first portion of the bleed air.

5. The bleed-air system of claim 4, further comprising:
    a bleed-air-environment-air heat exchanger configured to:
        receive the at least the first portion of the bleed air from the jet engine;
        receive environment air from environment via an environment-air inlet;
        cool the at least the first portion of the bleed air; and
        deliver the at least the first portion of the bleed air to the bleed-air turbine;
    wherein the bleed-air water extractor is configured to deliver the bleed-air water to the environment air for delivery of wet environment air to the bleed-air-environment-air heat exchanger.

6. The bleed-air system of claim 1, further comprising a bleed-air splitter configured to:
    split the bleed air into the first portion and a second portion;
    deliver the first portion to the bleed-air turbine; and
    deliver the second portion to the cabin.

7. The bleed-air system of claim 1, further comprising a bleed-air cooler configured to:
    receive the bleed air from the jet engine;
    receive cooling air; and
    cool the bleed air.

8. The bleed-air system of claim 7, wherein the cooling air is engine-fan bypass air from the jet engine.

9. The bleed-air system of claim 1, further comprising a bleed-air pressure-regulating shutoff valve upstream of the bleed-air turbine and configured to:
    receive the bleed air from the jet engine;
    regulate a pressure of the bleed air; and
    selectively shut off the bleed air responsive to an input.

10. The bleed-air system of claim 1, further comprising a bleed-air high-pressure shutoff valve upstream of the bleed-air turbine and configured to:
    receive the bleed air from the jet engine; and
    permit a flow of the bleed air only upon a pressure of the bleed air exceeding a threshold pressure.

11. The bleed-air system of claim 1, wherein the bleed-air system is configured to receive the bleed air from a high-pressure compressor stage of the jet engine.

12. An aircraft, comprising:
    a fuselage;
    a wing supported by the fuselage;
    a jet engine supported by the wing; and
    the bleed-air system of claim 1.

13. The aircraft of claim 12, wherein the bleed-air turbine and the cabin-exhaust compressor are supported by the wing.

14. A method of providing thrust to the aircraft of claim 12, the method comprising:
    expanding the at least the first portion of bleed air from the jet engine of the aircraft to drive the cabin-exhaust compressor with the bleed-air turbine;
    compressing the cabin exhaust air from the cabin of the aircraft with the cabin-exhaust compressor to generate compressed cabin exhaust air; and
    nozzling the compressed cabin exhaust air to environment with the cabin-exhaust nozzle.

15. The method of claim 14, further comprising cooling the at least the first portion of the bleed air upstream of the expanding.

16. The method of claim 15, further comprising precooling the at least the first portion of the bleed air upstream of the cooling.

17. The method of claim 15, further comprising reducing a pressure of the at least the first portion of the bleed air upstream of the cooling.

18. The method of claim 14, further comprising:
    splitting the bleed air into the first portion and a second portion; and
    delivering the second portion to the cabin.

19. The method of claim 14, further comprising extracting bleed-air water from the at least the first portion of the bleed air downstream of the expanding.

20. The method of claim 19 further comprising cooling the at least the first portion of the bleed air upstream of the expanding, wherein the cooling is performed at least in part with the bleed-air water.

* * * * *